United States Patent [19]

Piazza

[11] 4,229,497
[45] * Oct. 21, 1980

[54] COMPOSITE MODULE WITH REINFORCED SHELL

[75] Inventor: Matthew R. Piazza, Nichols, Conn.

[73] Assignee: Maso-Therm Corporation, Bridgeport, Conn.

[*] Notice: The portion of the term of this patent subsequent to Jan. 24, 1995, has been disclaimed.

[21] Appl. No.: 848,411

[22] Filed: Nov. 3, 1977

Related U.S. Application Data

[63] Continuation-in-part of Ser. No. 754,877, Dec. 27, 1976, abandoned.

[51] Int. Cl.² ............................ E04C 1/40; E04C 2/06
[52] U.S. Cl. ............................ 428/71; 52/309.12; 264/256; 264/257; 264/258; 264/271; 264/309; 264/DIG. 57; 428/76; 428/310
[58] Field of Search .................... 264/71, 72, 34, 253, 264/256, 257, 258, 271, 309, DIG. 57; 52/309.9, 309.11, 309.12, 612; 428/71, 76, 310

[56] References Cited

U.S. PATENT DOCUMENTS

| | | | |
|---|---|---|---|
| 2,425,883 | 8/1947 | Jackson | 72/59 |
| 3,289,371 | 12/1966 | Pearson | 264/35 X |
| 3,295,278 | 1/1967 | Muhm | 52/223 |
| 3,389,518 | 6/1968 | Horbach | 52/309 |
| 3,512,327 | 5/1970 | La Padura | 52/612 |
| 3,653,170 | 4/1972 | Sheckler | 428/312 X |
| 3,787,544 | 1/1974 | Barnette | 264/274 X |
| 3,922,413 | 11/1975 | Reineman | 264/129 X |
| 4,069,629 | 1/1978 | Piazza | 52/612 X |
| 4,084,362 | 4/1978 | Piazza | 52/309.12 X |
| 4,133,859 | 1/1979 | Piazza | 425/63 X |

FOREIGN PATENT DOCUMENTS

| | | | |
|---|---|---|---|
| 2045743 | 3/1971 | France | . |
| 1058396 | 2/1967 | United Kingdom | 428/313 |
| 1250713 | 10/1971 | United Kingdom | . |

Primary Examiner—Thomas P. Pavelko
Attorney, Agent, or Firm—Sprung, Felfe, Horn, Lynch & Kramer

[57] ABSTRACT

A composite module having a rigid foam core encapsulated in a shell of reinforced cementitious material. The shell is reinforced with at least two types of material, the first being a fiber reinforcing material distributed in an interconnected random matrix substantially throughout the shell and the second being a scrim reinforcing material adjacent at least one surface of the shell and/or the rigid foam core.

25 Claims, 11 Drawing Figures

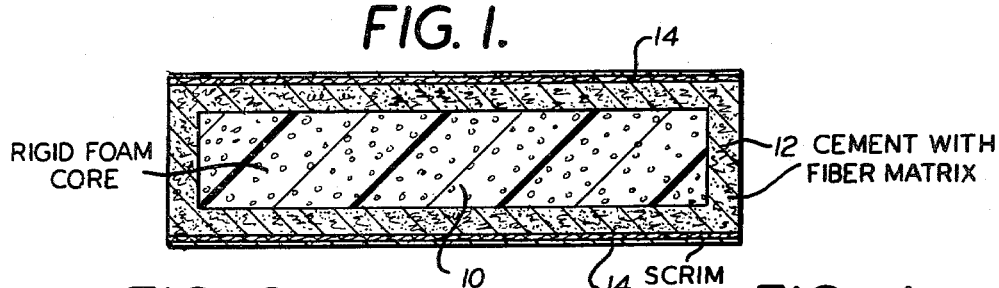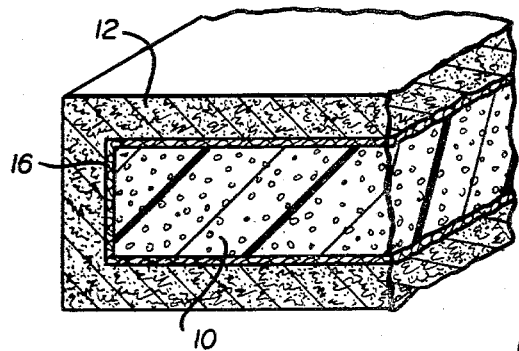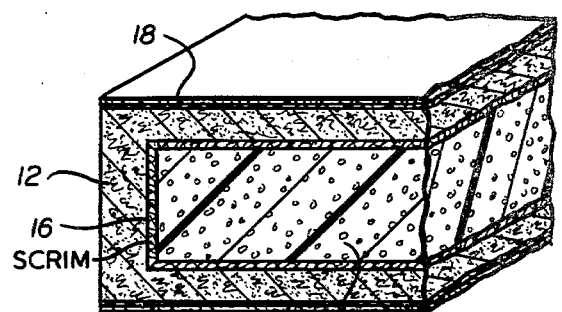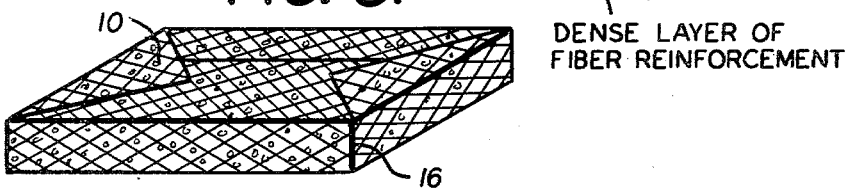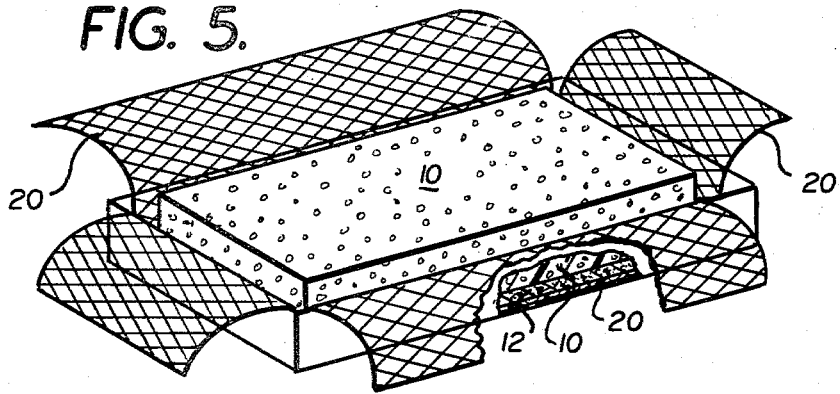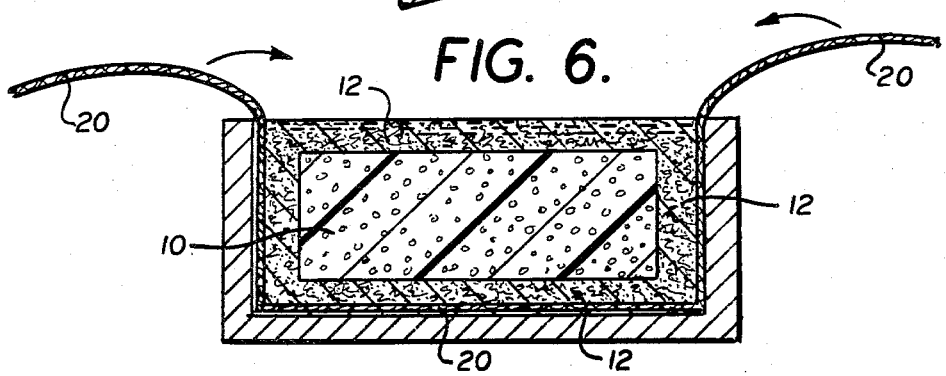

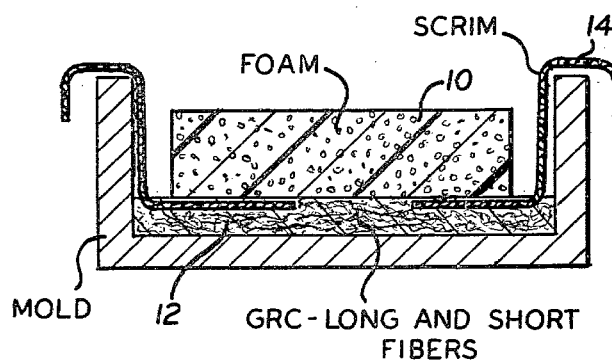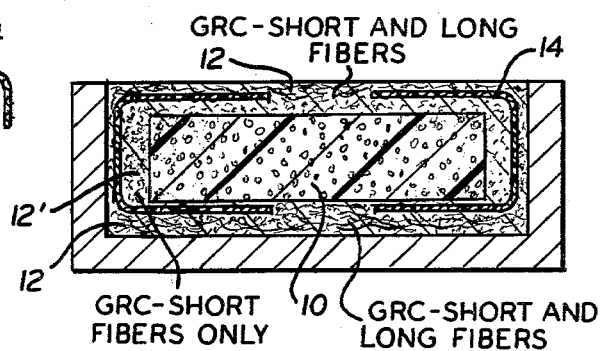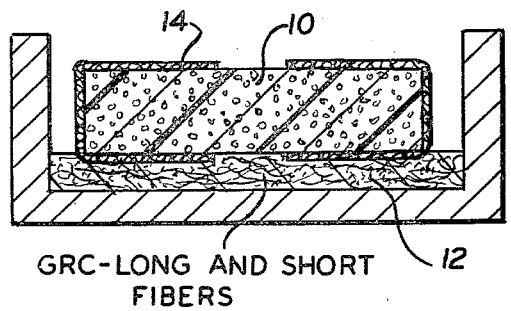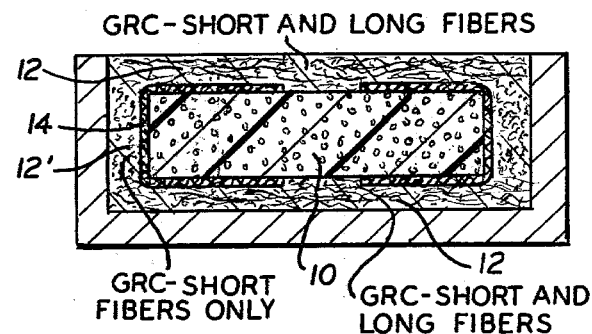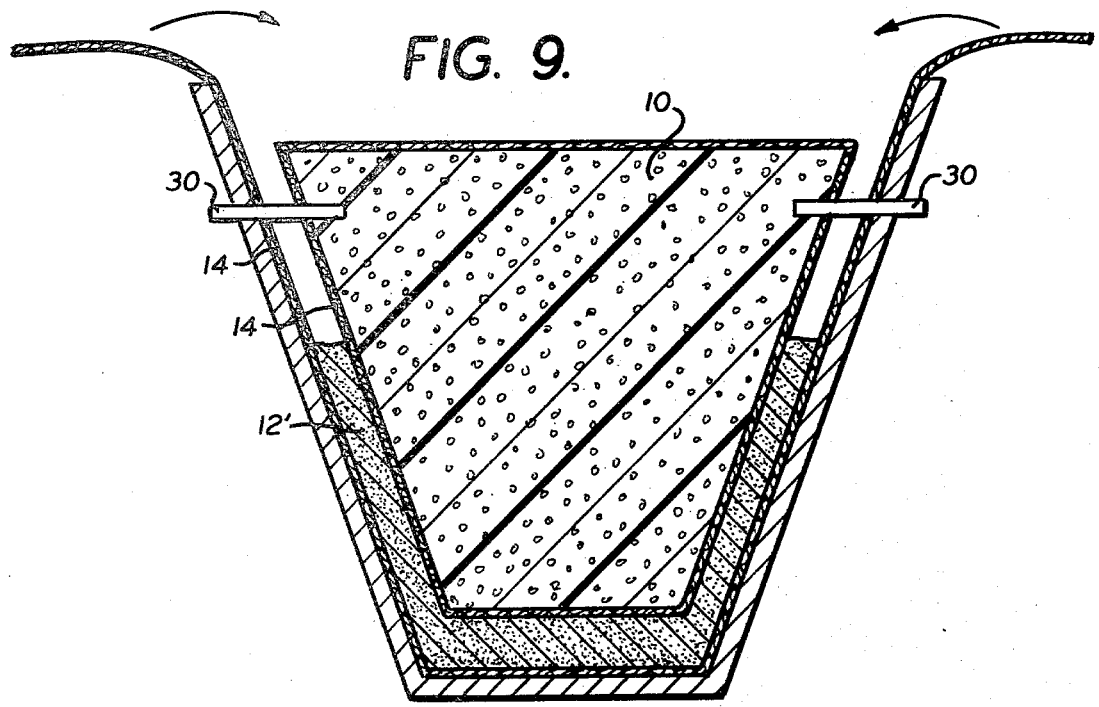

COMPOSITE MODULE WITH REINFORCED SHELL

RELATED APPLICATIONS

This application is a continuation-in-part of copending application Ser. No. 754,877 filed Dec. 27, 1976 now abandoned.

BACKGROUND

This invention relates to a composite module especially useful in building applications which is similar to monolithic cast concrete modules in outward appearance and use, yet has significant improvements in insulating properties and weight reduction. More particularly, this invention relates to a composite module having a rigid foam core encapsulated in a shell of cementitious material reinforced with two different types of fibrous reinforcement.

Because of increased costs in material and labor, the construction industry has come to use prefabricated building modules, for example wall panels, roof decks and the like. A popular form of construction is known as "curtain-wall" construction and involves the use of a structural steel skeleton to which prefabricated or precast panels are attached. Such curtain-wall panels are commonly cast from reinforced concrete and are provided with a surface finish such as a smooth concrete finish or aggregate imbedded into the face of the panels. These panels are extremely heavy. For example, a four foot by eight foot curtain-wall panel cast from reinforced concrete weighs from about 1,400 to 1,600 pounds and requires heavy construction equipment to install. In addition, these panels provide very poor insulating properties and by themselves are a very poor vapor barrier. This makes necessary further construction to insulate and seal the pre-cast concrete curtain-wall.

The construction industry has long sought improved building elements that will offer advantages in material and construction costs.

The present invention provides a monolithic-like building module which is extremely light in weight as compared to pre-cast concrete panels for example and which has greatly improved insulating and vapor barrier properties per se.

SUMMARY

The composite module of the invention has a rigid foam core, for example rigid polyurethane foam having a density in the range of two to five pounds per cubic foot, encapsulated in a shell of reinforced cementitious material. The cementitious shell is reinforced with a first fibrous reinforcing material in discrete fiber form distributed in an interconnected random matrix substantially throughout the shell and a second fibrous reinforcing material in scrim form adjacent at least one surface of the shell and/or the foam core.

The composite modules are made according to the present invention by providing a mold having a bottom and side walls and then depositing a layer of wet cementitious material and fibrous reinforcing material in the bottom of the mold. Scrim reinforcing material can be placed under or over the bottom layer and can also extend up and over the side walls or the scrim material can be placed around the edges of the mold and up and over the side walls.

A rigid foam core which can be partly (e.g., around the edges) or completely wrapped with scrim reinforcing material is placed on the layer. The foam core member has a peripheral shape smaller than the mold interior leaving a free space between the core and the mold side walls. The core also has a thickness less than the height of the mold side walls.

With the core member in place, a further mixture of wet cementitious material and fibrous reinforcing material is deposited to fill the free space and cover the core member with a top layer thereby encapsulating the core member in a shell of wet cementitious material scrim material extending over the mold side walls can be folded in and incorporated into the top layer before, during or after its deposition.

As a last step the wet cementitious shell is allowed to cure and the finished module is then removed from the mold.

DESCRIPTION OF THE DRAWING

The present invention will be more fully understood from the following description taken in conjunction with the accompanying drawing wherein:

FIG. 1 is a cross-sectional view of a composite module according to the present invention;

FIG. 2 is a cross-sectional view in perspective and partly broken away of a modification of the module shown in FIG. 1;

FIG. 3 is a perspective view showing a rigid foam core member wrapped in scrim reinforcing material and which is ready to be incorporated into a composite module of the invention;

FIG. 4 is a sectional view in perspective and partly broken away of an alternate embodiment of the composite module of FIG. 1;

FIG. 5 is a perspective view partly broken away illustrating one embodiment for forming composite modules according to the invention;

FIG. 6 is a cross-sectional view showing the formation of composite modules according to the invention;

FIGS. 7a and b are cross sectional views showing a preferred embodiment for forming composite modules according to the invention; and FIGS. 8a and b are cross-sectional views showing an alternate to the preferred embodiment shown in FIGS. 7a and b.

FIG. 9 is a cross-sectional view showing a further embodiment for forming a composite module such as a highway barrier according to the present invention.

DESCRIPTION

The drawings will be described with reference to a preferred embodiment wherein the first reinforcing material is glass fiber, the scrim reinforcing material is coated glass fiber scrim, and the rigid foam core is polyurethane foam.

A preferred embodiment is shown in FIGS. 7 and 8. The composite module, preferably a panel-like building module, has a rigid foam core 10 encapsulated in a shell of cementitious material having edge portions 12' and major surface portions 12. The shell is reinforced with a first fibrous reinforcing material in discrete fiber form in two different fiber lengths, the shorter fibers being distributed in an interconnected random matrix throughout the shell, that is in the edge portions 12' and the major surface portions 12, while the longer fibers are distributed in an interconnected random matrix together with the shorter fibers in at least one preferably both major surface portions 12 of the shell. The second fibrous reinforcing material 14 in scrim form is located in the edge portions 12' of the shell and extends therefrom into at least one and preferably both major surface portions 12 of the shell.

The combined use of short and long fibers has processing advantages in that the shorter fibers can be premixed with the cementitious material and the longer fibers can be deposited for example by cutting and chopping, in situ during formation of the shell. This, together with the use of scrim reinforcing material 14, provides excellent reinforcing for the shell plus efficient processing. The premixed shorter fibers can be from about one quarter to about three quarters of an inch in length preferably about one half inch in length, and are present in an amount of from about one to three percent by weight, preferably about two percent by weight, based on the weight of the wet cement. The longer fibers which are preferably chopped and deposited during formation of the major surface portions 12 of the shell can be up to three inches in length preferably about two inches in length and are present in an amount of from about one to about three percent by weight, preferably about two percent by weight, based on the weight of the wet cementitious material. The total amount of fibrous reinforcement in both the shorter and longer fiber form and the scrim form is ideally about five percent by weight based on the weight of the wet cementitious material. However, in practice it has been found that this can be reduced to about four percent by weight while still retaining the desired strength characteristics for the completed module. It is believed that the unique combination of reinforcing materials as provided by the present invention makes it possible to reduce the total amount of fibrous reinforcement without sacrificing any desired physical properties.

FIG. 1 shows a polyurethne foam core 10 encapsulated in a cement shell 12 which is reinforced with a glass fiber matrix. In this embodiment the scrim 14 is shown adjacent the major surfaces of the panel, that is the front and back of the panel. As shown in FIG. 1 the scrim reinforcement 14 can be just below the surface of the shell 12 and care should be taken to thoroughly imbed the scrim reinforcement 14 into the cement/glass fiber shell 12. Stated differently, to insure maximum reinforcement the glass fiber matrix and the scrim reinforcement 14 should be thoroughly wetted by the cementitious material.

As shown in FIG. 2 of the drawing, the scrim reinforcement 16 can surround the foam core 10 and again care should be taken to insure thorough imbedding of the scrim layer 16 in the cement/glass fiber shell 12. The scrim layer 16 can completely surround the foam core 10 as shown in FIG. 3 and in certain applications it is possible to band or wrap the core 10 with strips of scrim reinforcement in a crisscross or parallel pattern to gain the desired reinforcement characteristics.

FIG. 4 is similar to FIG. 2 and includes a further scrim reinforcement layer 18 which is in the form of a dense layer of chopped fiber reinforcement.

The term "scrim" is used herein to include woven non-woven and dense chopped fiber layers (e.g. layer 18 FIG. 4) which functions as a reinforcing layer with respect to the composite modules of the invention. The scrim material can be coarse or fine so long as it is sufficiently open to allow the cementitious mixture to penetrate and wet the scrim layer itself. Generally the scrim reinforcing material will have a screen like appearance with openings as small as an eighth of an inch up to two inches or more, preferably with openings of about a quarter of an inch up to one inch. Naturally, the type and the configuration of the scrim reinforcing material will depend on the ultimate use for the module being produced. For example for roof deck panels or curtainwall panels measuring approximately five by ten feet and four inches thick, a single layer of scrim with openings of approximately one half inch surrounding the foam core or adjacent to the major surfaces or around the edges (FIGS. 7 and 8) has been found to provide adequate reinforcement for these particular applications.

The first fibrous reinforcement in fiber form is preferably glass fiber chopped from rovings in lengths of one quarter to three inches and preferably from one to two inches. A preferred glass fiber is AR(alkali resistant) glass fiber sold under the trademark CEM-FIL and more particularly described in U.S. Pat. No. 3,901,720 issued Aug. 26, 1975.

For glass reinforced concrete (GRC), the generally recognized glass content is about five percent by weight with the glass fibers being distributed in an interconnected random matrix. However, through the use of a second scrim reinforcing material (as mentioned above), the total amount of fiber reinforcement can be reduced to about four percent by weight. This results in increased efficiency in handling and cost savings.

Because of availability and cost, the preferred first fibrous reinforcement (both short and long fibers) is glass fiber and preferably AR glass fiber, and the second scrim reinforcing material is preferably a glass fiber scrim such as E glass fiber scrim coated to impart alkalai resistance to the glass for example with a polyester coating. However, other similar and equivalent fibrous materials can be used for the first and second fibrous reinforcing materials within the context of the present invention. For example, the fiber and/or scrim reinforcing materials can be the same or different and can be made from aramid fiber such as KAVLAR by duPont, AR glass as described above, nylon fibers, polyester fibers, and the like including natural and synthetic inorganic and organic fibers, for example graphite fibers. The scrim can also be made of a combination of fibers such as glass fiber and aramid fiber.

The cementitious material is preferably common cement in admixture with conventional fillers such as sand or pumice and can contain conventional additives such as lime and stearates for water resistance, latex for added strength and wetting ability with respect to the fiber reinforcement, and water reducing agents such as "Pozzilith" for quick setting. Conventional tints or dyes can also be used to provide the desired coloration.

It is also possible to use as a cementitious material a sulfur based product marketed under the trademark SUMENT by Chevron Chemical Company. This sulfur based material can be used in admixture with sand or other conventional fillers following known techniques for handling this type of material.

The glass fiber reinforcement can be incorporated into the cementitious material in an interconnected random matrix by premixing and/or by successively applying wet cementitious material and chopped and sprayed glass fiber. With conventional GRC where the glass content is generally about five percent by weight, premixing of the glass and cement is generally not possible without disturbing or destroying the glass fiber matrix. However, it is possible to premix and preserve the glass fiber matrix when using less glass for example two percent by weight glass. The present invention thus provides an additional advantage in being able to use a premix of wet cement and glass fibers preferably in combination with longer chopped and sprayed fibers.

Mechanical treatments can also be employed to work the glass fiber matrix and/or scrim reinforcing material into the wet cement mixture. For example rollers made of wire, grid or mesh can be applied to the mixture of glass fiber and cement and/or the scrim reinforcing material to insure thorough wetting of the reinforcing materials by the cement. The use of dilute latex can also assist in the wetting operation.

Suitable rigid foams include inorganic and organic foams. Rigid urethane polymer foams are preferred. These well known materials are widely used principally for insulation purposes. Urethane polymer foams are commonly formed by combining the reactants (a polyol and an isocyanate) using airless spraying or liquid application techniques. Foaming commences almost instantaneously and is completed within a very short period of time depending on the type of urethane polymer composition employed. The density of rigid urethane foams also depends on the nature of the urethane composition employed but generally ranges between about 1.5 pounds per cubic foot to 10 pounds per cubic foot, more commonly from 2 to 5 pounds per cubic foot. Other suitable rigid foams include polyester foams, phenolic resin foams, isocyanurate foams and sulfur based foams marketed under the trademark SUFOAM by Chevron Chemical Company.

The process of the present invention for making composite modules will now be described. The first step is to provide a mold having bottom and side walls for example as shown in FIGS. 5 and 6. Wet cement and glass fiber are deposited in the bottom of the mold (preferably with vibration) to form a bottom layer. A rigid urethane polymer foam core 10 having, for example, a density of 2 to 2.5 pounds per cubic foot, is then placed on top of the bottom layer. The core member 10, as shown in FIG. 6, has a peripheral shape smaller than the mold interior leaving a free space between the core 10 and the mold side walls. The core member 10 also has a thickness less than the height of the mold side walls.

Wet cement and glass fibers are then deposited to fill the free space between the core number 10 and the side walls and to cover the core member 10 with a top layer (again, preferably with vibration) to encapsulate the core member 10 with a wet shell of reinforced cement 12. The wet shell is cured and the finished module removed from the mold.

To form the module shown in FIG. 1 of the drawing, a sheet of scrim material 14 is applied to the bottom of the mold before depositing the first layer of glass and cement as described above. After applying the further mixture of cement and glass to cover the core number 10 a second layer of scrim material 14 is imbedded into the upper surface of the mixture of cement and glass covering the top of the foam core 10.

To form the module of FIG. 2 the core number 10 is first wrapped with scrim material 16 as shown in FIG. 3 and the process is carried out as described above.

To form the module shown in FIG. 4, a similar operation is carried out but instead of applying a scrim layer 14 to the bottom of the mold, a dense layer of chopped fibers is first applied to the bottom of the mold before depositing the mixture of glass and cement 12. A similar layer 18 is imbedded into the top surface of the glass cement mixture covering the core number 10 and imbedded therein. The dense chopped layer 18 can be glass fiber preferably AR glass fiber or it can be chopped aramid fiber.

FIGS. 5 and 6 illustrate one way in which scrim reinforcement 20 can be provided adjacent the entire surface of the glass fiber reinforced cement shell 12. In this instance the scrim reinforcing material 20 is placed over the bottom of the mold and up and over the side walls. The bottom side and top layers are then formed around the core number 10 as described above and then the excess scrim material 20 is folded in over the top mixture of cement and glass 12 and imbedded therein, for example by using mechanical rolling techniques as described above.

It is preferred to form the cement glass fiber matrix by successively depositing chopped glass fibers and wet cement (preferably premixed with shorter glass fibers) while vibrating the mold. This insures complete wetting of the glass fibers by the cement without disturbing the glass matrix and also thorough filling of the free space between the core number 10 and the sides of the mold.

FIGS. 7 and 8 of the drawing illustrate a preferred embodiment wherein the bottom layer of the shell is formed by successively depositing a premix of wet cementitious material and fibers and individual fibers longer than the premixed fibers. For example, wet cement premixed with one half inch glass fibers can be applied in the desired thickness and then chopped and sprayed glass fibers of two inches in length are applied to the wet premix and rolled in to insure a complete wetting of the chopped fibers without breaking the matrix. The chopped fibers can be applied and rolled into the layer of premix in several steps if desired to reach the necessary level of glass loading for the bottom layer.

The free space around the edges of the core 10 and the mold side walls is preferably filled with a premix of wet cement and two percent by weight glass fibers one half inch in length, preferably with vibration to insure complete filling of the free space and wetting of scrim material positioned in the free space. The top layer can then be formed in the same manner as the formation of the bottom layer as described above.

More specifically, and by way of example, (again with reference to FIGS. 7 and 8 of the drawing) a mold is provided having a bottom and side walls which are four inches high.

A premix of cement and two percent of one-half inch glass fibers is prepared by first mixing a wetting agent such as methyl cellulose with one half inch glass fibers and then mixing the wet fibers with a mixture of cement and sand with the amount of water adjusted to compensate for the wetting agent added to the one half inch glass fibers. The pre-wetted glass fibers are added up to two percent by weight based on the weight of the wet cement to the mixture of cement and sand and the entire mixture is mixed further for a period of approximately five minutes before being used. This prevents cat balling of the glass fibers which results from over mixing.

The premix of wet cement and two percent one half inch glass fibers is then cast into the bottom of the mold to a thickness of three eighths of an inch. Chopped and sprayed glass two inches in length is then applied in several passes to the top of the bottom layer and rolled in after each pass to insure complete wetting of the chopped two inch glass fibers without breaking the matrix that results from the chopping and spraying operation.

The edges of the mold are then lined with glass fiber scrim which is a coated E glass fiber scrim with one quarter inch openings and furnished by J. P. Stevens under the name Lino scrim. The scrim is cut in long lengths and extends onto the bottom layer for a distance of approximately four inches from the mold side wall, up the mold side wall and thereover for a distance of approximately four inches. The scrim is pressed into the wet bottom layer to insure complete wetting of that portion of the scrim which is in contact with the bottom layer.

A rigid urethane foam core three inches in thickness is then placed on the bottom layer and over the scrim material extending into the bottom layer leaving a free space around the sides of the mold as shown in FIGS. 7a. If desired the core material can be pinned through the mold and spacers can be temporarily inserted to insure proper positioning of the core 10.

Another batch of premixed cement with one half inch glass fibers and an amount of two percent by weight is then applied to the top of the core and fed into the free space to fill same. The scrim material extending over the top of the side walls is then folded in followed by the application of another layer of premixed cement and glass fibers to a thickness of three eighths inch to form a top layer. The same one half inch glass fiber, two percent premixture is used to form the top layer and, again as in the formation of the bottom layer two inch glass fibers chopped and sprayed onto the top layer in several passes and rolled in after each pass. The amount of chopped and sprayed glass is two percent in the bottom layer and two percent in the top layer and the entire wet shell when formed has one half inch premixed glass fibers distributed throughout the shell that is in the side portions 12' and the two major surface portions 12 and in addition in the major surface portions 12 there are randomly distributed longer glass fibers of two inch in length in an interconnected random matrix together with the shorter fibers for a total glass fiber loading throughout the shell of approximately four percent by weight based on the wet cement.

To aid in filling distribution and wetting of the fibers the mold is vibrated intermittently during the application of the bottom and top layers and the filling of the free space between the mold side walls and the core 10.

As shown in FIG. 8 the scrim material 14 can be prepositioned around the edges of the foam core 10 and pinned or secured in place by an adhesive.

A key aspect of the preferred embodiments shown in FIGS. 7 and 8 of the drawing is the formation of a composite panel like building module having a fiber reinforced shell formed around the core 10 in situ. The entire shell made up of edge portions 12' and major surface portions 12 is cast or formed wet around the foam core 10 and the use of vibration insures complete filling and distribution and the avoidance of free spaces or parting lines. In curing the wet shell surrounding the foam core 10, the cement has a tendency to shrink and this places the fibers in the shell in tension around the rigid foam core which resists the shrinking effect of the cement. The nature of the fiber reinforced cement shell is such that it is self supporting which means that it can be removed from the mold within a very short period after casting the shell about the core 10. Periods of an hour or more have been found to be sufficient before removing the partially cured module from the mold and curing is completed by keeping the module wet for periods of up to three to five days.

In the embodiments shown in FIGS. 7 and 8, plain cement without fiber reinforcement can be used to fill the free spaces to form the edge portions 12' of the shell, the scrim reinforcement 14 providing the necessary reinforcement for integrity of the edge portions. However, it is preferred to use a premix of glass fibers and wet cement as described previously for filling the free space between the mold side walls and the side or edges of the core 10.

A specific embodiment of the invention is illustrated in FIG. 9 of the drawing with reference to a highway barrier profile which are presently conventionally made from pre-cast concrete. In this embodiment the mold is first lined with a layer of scrim reinforcing material 14 and then a rigid foam core member 10 wrapped in scrim reinforcing material 14 is suspended in the mold via pin members 30 so as to leave a free space between the wrapped core member 10 and the mold bottom and side walls. The free space can then be filled with a mixture of cement only as shown in FIG. 9 or a premixture of cement and glass fibers in an amount of about two percent by weight. FIG. 9 shows conventional cement 12' filling a portion of the free space between the wrapped core number 10 and the lined mold side walls and bottom. Complete formation of the product would naturally involve a complete filling of the free space, covering the top of the wrapped foam core number 10 and folding in and imbedding of the scrim material 14 lining the mold and extending up over the tops of the mold side walls. If desired the mold side walls can extend up even further and a heavier base material such as concrete can be applied either before the excess scrim material 14 lining the mold is folded in or the excess material can be folded over the base and imbedded therein after its put in place.

The embodiment shown in FIG. 9 lends itself especially well to the use of a mixture of SUMENT and sand as described above.

After fabrication of the module is complete the cement is allowed to cure under ambiant conditions or preferably in a steam heated curing enclosure. Curing can also be accelerated using hot wet cement made with water at about 122°–200° F. Once the cement is cured the composite module is removed from the mold and is ready for use.

One or more exterior surfaces of the shell 12 can be provided with any desired finished texture or design and can have imbedded therein inorganic aggregates such as gravel, broken stone, marble chips and the like. As for surface design and texture, the exterior of the shell 12 will conform to the surface finish of the mold which makes it possible to achieve desired effects for example a wood grained appearance or a ribbed configuration and the like.

The composite module of the invention can be used and installed in the same manner as conventional building modules such as pre-cast curtain-wall panels but because of the great reduction in weight simplified installation procedures are possible. Because of the greatly improved insulating and water vapor barrier properties the modules of the invention, no further steps have to be taken to insure these properties as is the case with conventional building modules.

In roof deck installations or curtain-wall installations, a room temperature curing elastomer such as a silicone elastomer can be used for edge-to-edge bonding between adjacent modules and the entire installation can be provided with an overcoating of a suitable elastomer. This provides for a shock resistant installation which can also compensate for later movement of a structure for example as a building settles after construction. The edges of the modules according to the invention can also be provided with one or more semi-circular longitudinal grooves to facilitate the use of flexible bead material made for example from synthetic polymer foams such as polyethylene positioned between adjacent modules to provide sealing against moisture and air.

The composite module of the invention can also be formed into insulated pipes and conduits, railroad ties, modular walls and even load bearing modular panels which can incorporate conduits for utilities, window frames, door frames and the like. It should also be noted that the composite module of the invention is buoyant because of the rigid foam core 10 and this can be utilized to advantage in the construction of floating docks and wharfs as well as off shore drilling platforms.

Typical properties of commercially available rigid urethane polymer foams are set forth in the following table:

| TYPICAL RIGID URETHANE FOAM PROPERTIES | | | | |
|---|---|---|---|---|
| Density lb./cu.ft. Astm D 1622 | Compressive Strength psi Astm D 1621 | Compressive Modulus psi Astm D 1621 | Shear Strength psi | Shear Modulus psi |
| 1.5–2.0 | 20–60 | 400–2000 | 20–50 | 250–550 |
| 2.1–30 | 35–95 | 800–3500 | 30–70 | 350–800 |
| 3.1–45 | 50–185 | 1500–6000 | 45–125 | 500–1300 |
| 4.6–70 | 100–350 | 3800–12,000 | 75–180 | 850–2000 |

What is claimed is:

1. Composite panel-like building module comprising a rigid foam core encapsulated in a fiber-reinforced shell of cementitious material having edge portions and major surface portions:
    (i) said major surface portions being reinforced with a first fibrous reinforcing material in discrete fiber form distributed in an interconnected random matrix in the major surface portions of the shell;
    (ii) said edge portions being reinforced with two further fibrous reinforcing materials, one being in discrete fiber form which is premixed with the cementitious material forming the edge portions and the other being in scrim form which extends from the edge portions into the major surface portions of the shell, said premixed fibers being shorter than the first fibrous reinforcing material in the major surface portion of the shell.

2. Composite module of claim 1 wherein the major surface portions of the shell also contain premixed fibers distributed in an interconnected matrix together with said fibrous reinforcing material.

3. Composite module of claim 1 wherein said cementitious material is a sulfur-based material.

4. Composite module of claim 1 wherein the rigid foam core is rigid urethane polymer foam.

5. Composite module of claim 1 wherein the rigid foam core is a sulfur-based material.

6. Composite module of claim 1 wherein the reinforcing materials are glass fiber.

7. Composite module of claim 1 wherein the premixed fibers are from about one-quarter to three-quarters of an inch in length, preferably about one-half inch in length and are present in an amount of from 1 to 3% by weight, preferably about 2% by weight.

8. Composite module of claim 1 wherein the fibers in the major surface portions of the shell are up to three inches in length, preferably about two inches in length and are present in an amount of from 1 to 3% by weight.

9. Composite, panel-like building module comprising a rigid foam core encapsulated in a fiber-reinforced cementitious shell, said shell being formed around the core in situ by
    (a) successively applying wet cementitious material and individual fibers up to about three inches in length by chopping same from rolls of continuous fibers and spraying same to the bottom of a mold having side walls,
    (b) distributing the glass fibers in the wet cementitious material to form a layer of wet cement with fibers in an interconnected random matrix,
    (c) positioning a scrim reinforcing material on the top of the bottom layer which extends therefrom up over the mold side walls,
    (d) placing the rigid foam core on said bottom layer, said core having a peripheral shape smaller than the mold interior leaving a free space between the core member and the mold side walls, said core member having a thickness less than the height of the mold side walls,
    (e) filling said free space with wet cement premixed with fibers,
    (f) folding the scrim material extending over the mold side walls in over the top of the foam core,
    (g) successively applying individual fibers up to about three inches in length by chopping same from rolls of continuous fibers and spraying same into the mold and wet cementitious material to the top of the foam core,
    (h) distributing the fibers into the wet cementitious material in an interconnected random matrix to encase said core with a shell of wet fiber reinforced cementitious material, and
    (i) allowing said wet shell to dry and harden.

10. The module according to claim 9, wherein the wet cementitious material of steps (a) and (g) is provided by premixing wet cement and fibers shorter in length than the individual fibers.

11. Composite, panel-like building module comprising a rigid foam core encapsulated in a fiber-reinforced cementitious shell, said shell being formed around the core in situ by
    (a) successively applying wet cementitious material and individual fibers up to about three inches in length by chopping same from rolls of continuous ribers and spraying same to the bottom of a mold having side walls,
    (b) distributing the glass fibers in the wet cementitious material to form a layer of wet cement with fibers in an interconnected random matrix,
    (c) positioning a scrim reinforcing material on the top of the bottom layer which extends therefrom up over the mold side walls,
    (d) placing the rigid foam core on said bottom layer, said core having a peripheral shape smaller than the mold interior leaving a free space between the core member and the mold side walls, said core member having a thickness less than the height of the mold side walls, (e) folding the scrim material extending over the mold side walls in over the top of the foam core, (f) filling said free space with wet cement premixed with fibers, (g) successively applying individual fibers up to about three inches in length by chopping same from rolls of continuous fibers and spraying same into the mold and wet cementitious material to the top of the foam core, (h) distributing the fibers into the wet cementitious material in an interconnected random matrix to encase said core with a shell of wet fiber reinforced cementitious material, and (i) allowing said wet shell to dry and harden.

12. The module according to claim 11 wherein the wet cementitious material of steps (a) and (g) is provided by premixing wet cement and fibers shorter in length than the individual fibers.

13. Composite, panel-like building module comprising a rigid foam core encapsulated in a fiber-reinforced cementitious shell, said shell being formed around the core in situ by (a) successively applying wet cementitious material and individual fibers up to about three inches in length by chopping same from rolls of continuous fibers and spraying same to the bottom of a mold having side walls, (b) distributing the glass fibers in the wet cementitious material to form a layer of wet cement with fibers in an interconnected random matrix, (c) placing a rigid foam core member, which is at least partly wrapped in a scrim reinforcing material around the side walls thereof, on said layer, said wrapped core member having a peripheral shape smaller than the mold interior leaving a free space between the wrapped core member and the mold side walls, said wrapped core member having a thickness less than the height of the mold side walls;

(d) depositing wet cementitious material premixed with fibers in the free space between the core member and the mold side walls;

(e) successively applying wet cementitious material and individual fibers in the mold, the fibers being applied by chopping rolls of continuous fibers and spraying the chopped fibers into the mold;

(f) distributing the fibers into the wet cementitious material applied in (e) in a random interconnected matrix to form a top layer over the core and folded scrim material to encase the core in an integral fiber reinforced shell of cementitious material; and (g) curing the wet cementitious shell surrounding the core and removing the thus formed module from said mold.

14. The module of claim 13 wherein the wet cementitious material is provided in steps (a) and (e) by premixing wet cement and fibers shorter in length than the individual fibers.

15. Composite module such as a highway barrier comprising a rigid foam core encapsulated in a shell of reinforced cementitious material which is formed in situ around the core by (a) providing a mold having a bottom and side walls;

(b) lining said mold with a scrim reinforcing materials (c) suspending a rigid foam core member wrapped in a scrim reinforcing material in said mold leaving a free space between the wrapped core member and the mold bottom and side walls (d) filling said free space with a premix of wet cementitious material and fibers; and (e) curing said cementitious material and removing the thus formed module from the mold.

16. Process for making a composite panel-like building module having a rigid foam core encapsulated in a shell of reinforced cementitious material which comprises:

(a) providing a mold having a bottom and side walls;

(b) successively applying wet cementitious material and individual fibers in the mold, the fibers being applied by chopping rolls of continuous fibers and spraying the chopped fibers into the mold;

(c) distributing the fibers into the wet cementitious material in a random interconnected matrix to form a bottom layer;

(d) placing scrim reinforcing material on top of the bottom layer and which extends therefrom up over the top of the mold side walls;

(e) placing a rigid foam core member on said bottom layer, said core member having a peripheral shape smaller than the mold interior leaving a free space between the core member and the mold side walls, said core member having a thickness less than the height of the mold side walls;

(f) depositing wet cementitious material premixed with fibers in the free space between the core member and the mold side walls;

(g) folding the scrim material extending over the top of the mold side walls in over the core member;

(h) successively applying wet cementitious material and individual fibers in the mold, the fibers being applied by chopping rolls of continuous fibers and spraying the chopped fibers into the mold;

(i) distributing the fibers into the wet cementitious material applied in (h) in a random interconnected matrix to form a top layer over the core and folded scrim material to encase the core in an integral fiber reinforced shell of cementitious material; and (j) curing the wet cementitious shell surrounding the core and removing the thus formed module from said mold.

17. Process of claim 16 wherein the distributing of steps (c) and (i) are carried out by vibrating the mold.

18. Process of claim 16 wherein the wet cementitious material is provided in steps (b) and (h) by premixing wet cement and fibers shorter in length than the individual fibers.

19. Process for making a composite panel-like building module having a rigid foam core encapsulated in a shell of reinforced cementitious material which comprises:

(a) providing a mold having a bottom and side walls;

(b) successively applying wet cementitious material and individual fibers in the mold, the fibers being applied by chopping rolls of continuous fibers and spraying the chopped fibers into the mold;

(c) distributing the fibers into the wet cementitious material in a random interconnected matrix to form a bottom layer;

(d) placing scrim reinforcing material on top of the bottom layer and which extends therefrom up over the top of the mold side walls;

(e) placing a rigid foam core member on said bottom layer, said core member having a peripheral shape smaller than the mold interior leaving a free space between the core member and the mold side walls, said core member having a thickness less than the height of the mold side walls;

(f) folding the scrim material extending over the top of the mold side walls in over the core member;

(g) depositing wet cementitious material premixed with fibers in the free space between the core member and the mold side walls;

(h) successively applying wet cementitious material and individual fibers in the mold, the fibers being applied by chopping rolls of continuous fibers and spraying the chopped fibers into the mold;

(i) distributing the fibers into the wet cementitious material applied in (h) in a random interconnected matrix to form a top layer over the core and folded scrim material to encase the core in an integral fiber reinforced shell of cementitious material; and (j) curing the wet cementitious shell surrounding the core and removing the thus formed module from said mold.

20. Process of claim 19 wherein the distributing of steps (c) and (i) are carried out by vibrating the mold.

21. Process of claim 19 wherein the wet cementitious material is provided in steps (b) and (h) by premixing wet cement and fibers shorter in length than the individual fibers.

22. Process for making a composite panel-like building module having a rigid foam core encapsulated in a shell of reinforced cementitious material which comprises:

(a) providing a mold having a bottom and side walls;

(b) successively applying wet cementitious material and individual fibers in the mold, the fibers being applied by chopping rolls of continuous fibers and spraying the chopped fibers into the mold;

(c) distributing the fibers into the wet cementitious material in a random interconnected matrix to form a bottom layer;

(d) placing a rigid foam core member, which is at least partly wrapped in a scrim reinforcing material around the side walls thereof, on said layer, said wrapped core member having a peripheral shape smaller than the mold interior leaving a free space between the wrapped core member and the mold side walls, said wrapped core member having a thickness less than the height of the mold side walls;

(e) depositing wet cementitious material premixed with fibers in the free space between the core member and the mold side walls;

(f) successively applying wet cementitious material and individual fibers in the mold, the fibers being applied by chopping rolls of continuous fibers and spraying the chopped fibers into the mold;

(g) distributing the fibers into the wet cementitious material applied in (f) in a random interconnected matrix to form a top layer over the core and folded scrim material to encase the core in an integral fiber reinforced shell of cementitious material; and (h) curing the wet cementitious shell surrounding the core and removing the thus formed module from said mold.

23. Process of claim 22 wherein the distributing of steps (c) and (g) are carried out by vibrating the mold.

24. Process of claim 22 wherein the wet cementitious material is provided in steps (b) and (f) by premixing wet cement and fibers shorter in length than the individual fibers.

25. Process for forming a composite module such as a highway barrier having a rigid foam core encapsulated in a shell of reinforced cementitious material which comprises (a) providing a mold having a bottom and side walls;

(b) lining said mold with a scrim reinforcing material;

(c) suspending a rigid foam core member wrapped in a scrim reinforcing material in said mold leaving a free space between the wrapped core member and the mold bottom and side walls;

(d) filling said free space with a premix of wet cementitious material and fibers; and (e) curing said cementitious material and removing the thus formed module from the mold.

* * * * *